(12) United States Patent
Juergens

(10) Patent No.: US 12,511,739 B2
(45) Date of Patent: Dec. 30, 2025

(54) COMPUTER AIDED ASSISTANCE SYSTEM AND METHOD

(71) Applicant: OLYMPUS Winter & Ibe GmbH, Hamburg (DE)

(72) Inventor: Thorsten Juergens, Hamburg (DE)

(73) Assignee: Olympus Winter & Ibe GmbH, Hamburg (DE)

( * ) Notice: Subject to any disclaimer, the term of this patent is extended or adjusted under 35 U.S.C. 154(b) by 456 days.

(21) Appl. No.: 18/098,756

(22) Filed: Jan. 19, 2023

(65) Prior Publication Data
US 2023/0260114 A1 Aug. 17, 2023

Related U.S. Application Data

(60) Provisional application No. 63/310,653, filed on Feb. 16, 2022.

(51) Int. Cl.
G06T 7/00 (2017.01)
A61B 1/00 (2006.01)
G16H 50/20 (2018.01)

(52) U.S. Cl.
CPC ........ *G06T 7/0012* (2013.01); *A61B 1/00009* (2013.01); *G16H 50/20* (2018.01); *G06T 2207/30032* (2013.01); *G06T 2207/30096* (2013.01)

(58) Field of Classification Search
CPC .............. A61B 1/00009–000096; G16H 50/20
See application file for complete search history.

(56) References Cited

U.S. PATENT DOCUMENTS

| | | |
|---|---|---|
| 2012/0283574 A1 | 11/2012 | Park et al. |
| 2012/0316421 A1 | 12/2012 | Kumar et al. |
| 2015/0080702 A1 | 3/2015 | Boardman et al. |
| 2019/0297276 A1 | 9/2019 | Sachdev et al. |
| 2021/0153808 A1 | 5/2021 | Tada et al. |
| 2021/0307841 A1 | 10/2021 | Buch et al. |

(Continued)

FOREIGN PATENT DOCUMENTS

WO 2011/156001 A1 12/2011

OTHER PUBLICATIONS

Kato, Motohiko, et al. "Validation of treatment algorithm based on the Japan narrow-band imaging expert team classification for sub-centimeter colorectal polyps." Endoscopy international open 6.08 (2018): E934-E940. (Year: 2018).*

(Continued)

*Primary Examiner* — Raphael Schwartz
(74) *Attorney, Agent, or Firm* — Scully, Scott, Murphy & Presser, P.C.

(57) ABSTRACT

A computer aided assistance system for use in endoscopic colonoscopy procedures. The computer aided assistance system including: at least one videoendoscopic instrument configured to capture image data; a controller comprising hardware, the controller being connected with the at least one videoendoscopic instrument; and a display connected or integral with the controller, wherein the controller being configured to automatically select a treatment guideline based on a combination of both a size and a classification of a lesion shown in the image data and to display the selected treatment guideline on the display.

20 Claims, 3 Drawing Sheets

(56) References Cited

U.S. PATENT DOCUMENTS

2023/0043645 A1* 2/2023 Protsenko .............. A61B 1/31

OTHER PUBLICATIONS

S. Tanaka et al., "Evidence-based clinical practice guidelines for management of colorectal polyps", J. Gastroenterol (2021) 56:323-335, Japanese Society of gastroenterology.

M. Kato et al., "Validation of treatment algorithms based on the Japan narrow-band imaging expert team classification for sub-centimeter colorectal polyps", Endoscopy International Open 2018; 06: E934-940.

* cited by examiner

COMPUTER AIDED ASSISTANCE SYSTEM AND METHOD

CROSS-REFERENCE TO RELATED APPLICATION

The present application is based upon and claims the benefit of priority from U.S. Provisional Patent Application No. 63/310,653 filed on Feb. 16, 2022, the entire contents of which is incorporated herein by reference.

BACKGROUND

Field

The present disclosure concerns a computer aided assistance system for use in endoscopic colonoscopy procedures, the assistance system comprising at least one videoendoscopic instrument, a controller connected with the at least one videoendoscopic instrument and a display connected with the controller, and a software program for the controller of the computer aided assistance system.

The present disclosure is related to concepts of the creation of a user interface for a computer aided assistance or detection system (CAA, CAD) to be is used in endoscopic procedures. The disclosed embodiments can improve the safety of endoscopic procedures along with the usability and the user experience of CAA and CAD devices computer aided detection. Within the context of the present disclosure, the term computer aided assistance system comprises computer aided detection systems.

Prior Art

Current devices and software applications to deploy computer aided detection (CADe) and computer aided diagnosis (CADx) in endoscopic procedures are not well connected to each other and to documentation systems. There are only very limited ways of interacting with such systems. This renders them cumbersome and prone to reduce procedural safety as well as reliability of diagnoses performed by such systems.

In the field of colonoscopy, that is, the endoscopic examination of the large intestine, the colon, the operator has to identify any lesions that are visible in the endoscopic imagery during the colonoscopy. Lesions may be present as polyps, adenomas (lesions having the potential of becoming cancerous) or cancerous structures. Depending on their size and characteristics, the operating surgeon has to decide whether to remove such lesions or not, and which procedure to use. The correct choice of removal procedure will have an immediate effect on the occurrence of post procedural complications or the lack thereof.

The question of which procedures should be applied in what situations has been under intense study. An exemplary overview can be found in S. Tanaka et al., *"Evidence-based clinical practice guidelines for management of colorectal polyps"*, J. Gastroenterol (2021) 56:323-335 of the Japanese Society of gastroenterology. These practice guidelines are intended to be used by general clinicians treating colorectal lesions. It is ultimately a standard reference and should be used in conjunction with careful consideration of each patient's preferences, age, complications, and social situation. It introduces clinical questions for the treatment of colorectal polyps including the surveillance after treatment underlying the contents of the practice guidelines. Some of the recommendations include performing endoscopic rejections for lesions ≥6 mm in size, as well as for diminutive polypoid adenomas ≤5 mm in size, as well as for flat and depressed neoplastic lesions even if ≤5 mm in size. The document also comments on the management of hyperplastic polyps, indications for cold snare polypectomy, serrated colorectal lesions and naturally spreading tumors, among others.

Work has also been done to find out whether it is possible to find out whether treatment guidelines have an effect in promoting procedural safety and clinical results in the treatment of colorectal lesions. A study pertaining to this aspect is published in M. Kato et al., *"Validation of treatment algorithms based on the Japan narrow-band imaging expert team classification for sub-centimeter colorectal polyps"*, Endoscopy International Open 2018; 06: E934-E940. This study included a retrospective study of several thousand treatments of small polyps based on endoscopic diagnosis, including narrowband imaging with magnifying endoscopes (NBIME). For the study, the lesions found and documented in those earlier procedures were first categorized by experts according to their macroscopic type as being of type 0-Ip, 0-Is, 0-Isp, 0-IIa or 0-IIc. Lesions of the macroscopic types 0-Is, 0-Isp and 0-IIa were then classified according to the JNET classification scheme as being Type 1, Type 2A, Type 2B or Type 3. In the cases of JNET Types 1 and 2A, the size of the lesion was taken into account as well, whereas in macroscopic type 0-IIc, the pit pattern on the surface of the lesion was taken into account. Dependent on their classification (macroscopic type, NICE or JNET classification, size of lesion and/or pit pattern), the experts, following the workflow or algorithm set about for this purpose, arrived at different treatment suggestions such as leaving it in place, resection by cold snare polypectomy (CSP), resection by cold forceps polypectomy (CFP), resection by hot snare polypectomy (HSP), endoscopic mucosal resection (EMR) or removal by surgery. For each lesion in this study, it was analyzed whether the actual resection had been performed in compliance with the recommendation arrived at with the workflow/algorithm used by the experts or not. It was found that resections that had been performed in compliance with the schematics had much lower risk of complications than noncompliant resections.

SUMMARY

An object is to improve procedural security and decrease the occurrence of post operational complications in endoscopic colonoscopy procedures.

Such object can be achieved by a computer aided assistance system for use in endoscopic colonoscopy procedures, the assistance system comprising at least one videoendoscopic instrument, a controller connected with the at least one videoendoscopic instrument and a display connected or integral with the controller, the controller being configured to automatically select a treatment guideline based on a combination of both the size and the classification of a lesion shown by the videoendoscopic instrument and to display the selected treatment guideline on the display.

Whereas a surgeon conducting a colonoscopy will ultimately always depend on his or her judgment when diagnosing a colorectal lesion and deciding on a treatment strategy, the computer aided assistance system is configured to aid in the diagnosis and treatment decision process. For example, by providing a standard reference framework for treatment options based on lesion size and characteristics, it provides the operator with standardized and well-proven treatment options for a variety of lesions. This baseline of treatment options can be available immediately after the lesion size and classification are known to the system, which can help avoid lengthy and potentially dangerous holdups. The operator can then factor in other parameters that may alter the recommendation of the treatment method, such as the age or the overall condition of the patient or the surrounding colon.

The computer aided assistance system can be an implementation of a computer-based clinical support system (CDSS) that is configured to support and assist the operator, e.g., a surgeon, in performing colonoscopies and choosing the correct treatment for a variety of colorectal lesions.

The classification of lesions may follow any established classification scheme, such as those according to JNET or NICE, or any other classification schemes, including proprietary schemes used by a manufacturer of the computer aided assistance system.

The videoendoscopic instrument may be any endoscopic device that provides video imagery, either by a distal camera unit, a proximal camera unit or a separate camera head. For the purpose of resecting lesions, the videoendoscopic instrument may have one or more separate channels for supplying endotherapy tools to the distal end.

In embodiments, the controller can comprise an endoscope controller providing supply and video processing functionality and an image analysis controller, the endoscope controller and the image analysis controller being configured as separate and connected devices or as software and/or hardware units within a single device. If the controllers are provided as separate and connected devices, it is possible to reuse existing endoscopic controllers without alteration.

In a further aspect, the controller, such as the image analysis controller, comprises image recognition functionality and is configured to perform at least one of the following actions automatically on the images provided by the videoendoscopic instrument:
  recognizing a lesion inside a colon,
  determining a size of a lesion and
  determining a classification of a lesion.

The image recognition functionality may be implemented in known fashion, either by known image recognition algorithms or in the form of neural networks client on a multitude of pre-classified images of colorectal lesions of various types, or by other known methods. In this way, the computer aided assistance system provides the operator, partially or fully, with lesion specifications such as size and/or classification derived automatically by the controller. This can provide an independent basis for the automatic selection of the treatment guideline from the visual evaluation by the operator and thereby increases the robustness of the diagnosis and selection of appropriate treatment of lesion.

In a further aspect, at least one of the determination of the size of the lesion and the determination of the classification of the lesion can be based on image processing, such as by using narrow band imaging (NBI), which can take into account a pit pattern on the surface of the lesion, on voice input from an operator or on a manual input or selection by an operator through a human interface device, wherein the human interface device can be implemented in the display or the controller. By this, it is provided that the operator may supply one or more of the size of the lesion in the classification of the lesion either by voice input or manual input. For this purpose, the system may be provided with a microphone device connected to or implemented with the controller, such as the image analysis controller.

In a further aspect, the controller, such as the image analysis controller, can be configured to at least one of identify and record a location of the lesion. This means that the controller can be aware of the position of the distal end of the review endoscopic device inside the colon and releases the operator from manually locating the lesion and/or recording the location of the lesion. This may be supported by including landmark detection functionality into the controller, the landmarks being specific networks of the human colon, such as the hepatic flexure, the splenic flexure, the rectum or the cecum (ileocecal valve), among others. Alternatively, to automatic landmark detection, the arrival at a landmark may also be input by voice command. This location information may be combined with the length measurements indicating how far the videoendoscopic device has been extended into the patient's colon.

If a landmark detection or input is implemented, the present position may be indicated on the display, for example in the form of a progress bar having markers for the landmarks, or on a schematic representation of the patient's colon. The location of findings of lesions can be grouped as an estimation in between landmarks, or the positioning/localization between landmarks can be enhanced by audio comments, for example by providing the insertion depth of the endoscope as voice input, or also the combination with other tools such as electromagnetic tracking.

In an aspect of the system, the suggested treatment guideline can include one or more of
  a suggestion to leave the lesion in place,
  a suggestion to perform polypectomy using hot snare polypectomy/endoscopic mucosal resection,
  a suggestion to perform cold polypectomy, such as at least one of cold snare polypectomy and cold forceps polypectomy and
  a suggestion to remove the lesion by surgery.

In a further aspect of the system, the controller, such as the image analysis controller, can be configured to provide at least one of structured voice interaction functionality and unstructured voice interaction functionality for at least one of
  inputting at least one of a size of a lesion and a classification of a lesion,
  in-procedure reporting, such as documentation of resected mucosal areas and resection result,
  correcting at least one of computer aided detection algorithm findings and computer aided diagnosis algorithm findings and
  documenting findings not covered by computer aided detection algorithms and computer aided diagnosis algorithms.

Of these, in-procedure reporting may be done with unstructured voice is interaction functionality, but also in a more standardized fashion with structured voice interaction functionality, in which certain standardized fields that are common to all or most findings of lesions in colonoscopy are addressed by their field name or category name and information supplied once the field is selected. The inputting of at least one of the size of lesion and classification of the lesion can be done with structured voice interaction functionality. The same is true for correcting at least one of computer-aided detection algorithm findings and computer aided diagnosis algorithm findings. The documentation of findings not covered or found by computer aided detection algorithms and computer aided diagnosis algorithms is more typical for unstructured voice interaction functionality. In this case, the voice input of the operator may be recorded or transcribed into text. The voice recording over the transcribed text may be stored together with the video segment and or estate image which may be taken automatically.

In a further aspect of the system, the controller, such as the image analysis controller, can be configured to provide at least one of the following additional functionalities:
- providing detection algorithms for detecting endotherapy tools and automatic suppression of CAD overlays when endotherapy tools are detected;
- indicating insufficient coverage of mucosal surface to the operator;
- presenting previous reports or findings to the operator for comparison;
- creating an automatic case summary.

The provision of detection algorithms for detecting endotherapy tools can be done automatically with image recognition algorithms specifically configured or trained for the detection of endotherapy tools such as snares, forceps, baskets, curettes or knives. Since the presence of an endotherapy tool indicates that the operator is in the process of making a resection of a lesion, any additional CAD overlays would prevent the operator from accurately seeing the totality of the lesion and its environment during the procedure and increase cognitive load for the operator. Deactivating overlays therefore removes the visual hindrance from the displayed scene and increases the safety of the procedure as long as the endotherapy tool is present in the unit.

The indication of insufficient coverage of mucosal surface to the operator is beneficial to avoid having blind spots in the coverage of the colon wall. The operator may be prompted to move the endoscope in specific directions to include coverage of the previously blind spot, e.g., by displaying an arrow mark. This may also take the form of outlining areas of the image where peripherals are not well visualized or of textual information. If the incomplete coverage cannot be filled in, the presence of the blind spot might be recorded and/or indicated on a progress bar or likewise progress indicating means.

The presentation of previous reports of findings to the operator for comparison can be implemented by having the controller, such as the image analysis controller, have access to the case file. This can be helpful when the locations of previously detected lesions or previously removed lesions are matched to the present location of the distal end of the videoendoscope and the matching findings of a previous procedure are displayed or read to the operator for comparison. This feature can provide contextual awareness of the location of current and previous findings. For example, the location of the current funding, for example a polyp detected by a CAD algorithm, can be compared with findings of previous procedures, for example to check the progression of a diminutive hyperplastic lesion. The operator will then be able to evaluate the further development of a previously found lesion that was not removed or the healing process of the site where the lesion had been removed previously. Previous findings can also be displayed to the operator, for example on a progress bar or a schematic representation of the colon. Furthermore, once a location with the previous finding is reached, the previous finding, that is, images and/or videos, can be displayed. The playback and display may be controlled through voice interaction, for example.

The controller, such as the image analysis controller, may also be provided by the functionality of creating an automatic case summary. In addition to the usual data of the case summary, such as the date, time, length of the colonoscopy, the identities of the patient and the operator, equipment used etc., the automatic case summary may also include video segments and/or still images taken during the colonoscopy as well as findings with respect to lesions, any voice inputs, as well as information about lesion location, size and classification as detected automatically, input by manual input or voice command and any corrections to the automatic findings, selected treatment guidelines and the resection of lesions and the method and tools used for resection. The case summary may also include data of previous findings, such as location meta data as well as size and classification metadata of the previous findings.

The case summary may be reviewed by the operator after the procedure and be accessed through different devices, for example desktop PCs, tablets or mobile phones, either through a peer-to-peer connection with the CAD system work through a third storage location to which the CAD system has stored the case summary. The user interface of the case summary may be used in order to correct findings of the algorithm, to add missing information or to delete excessive information. After the case summary is finalized, it may be exported to other documentation tools and databases.

Such object can also be achieved with a computer aided assistance method for endoscopic colonoscopy procedures, wherein during an endoscopic colonoscopy procedure a controller, such as an image analysis controller, of a computer aided assistance system described before automatically selects a treatment guideline based on a combination of both the size and the classification of a lesion shown by the videoendoscopic instrument of the computer aided assistance system and displays the selected treatment guideline on the display of the computer aided assistance system. The software program thereby implements the same characteristics, advantages and features as the computer aided assistance system.

In a further aspect, the controller, such as the image analysis controller, can perform at least one of the following actions automatically on the images provided by the videoendoscopic instrument by image processing and recognition:
- recognizing a lesion inside a colon,
- determining a size of a lesion and
- determining a classification of a lesion,
- using narrow band imaging (NBI), taking account of a pit pattern on the surface of the lesion.

The controller, such as the image analysis controller, may at least one of identify and record the location of the lesion. Furthermore, at least one of
- inputting at least one of a size of a lesion and a classification of a lesion,
- in-procedure reporting, such as documentation of resected mucosal areas and resection result,
- correcting at least one of computer aided detection algorithm findings and computer aided diagnosis algorithm findings and
- documenting findings not covered by computer aided detection algorithms and computer aided diagnosis algorithms may be carried out using at least one of structured voice interaction functionality and unstructured voice interaction functionality provided by the controller, such as the image analysis controller.

In further aspects, the controller, such as the image analysis controller, may perform at least one of:
- providing detection algorithms for detecting endotherapy tools and automatic suppression of CAD overlays when endotherapy tools are detected,
- indicating insufficient coverage of mucosal surface to the operator, presenting previous reports or findings to the operator for comparison, and creating an automatic case summary.

These functionalities have been discussed in the context of the computer aided assistance system.

Such object can also be achieved by a computer program with computer code means, which, when executed on a controller, such as an image analysis controller, of an above-described computer aided assistance system, provides the controller, such as the image analysis controller, with functionality to automatically select a treatment guideline based on a combination of both the size and the classification of a lesion shown by the videoendoscopic instrument of the computer aided assistance system and to display the selected treatment guideline on the display of the computer aided assistance system, and can additionally with any further functionality or functionalities of the controller, such as the image analysis controller, of the above-described computer aided assistance system and method.

BRIEF DESCRIPTION OF THE DRAWINGS

Further characteristics will become apparent from the description of is the embodiments together with the claims and the included drawings. Embodiments can fulfill individual characteristics or a combination of several characteristics.

The embodiments are described below, without restricting the general intent of the invention, based on exemplary embodiments, wherein reference is made expressly to the drawings with regard to the disclosure of all details that are not explained in greater detail in the text. In the drawings.

In the drawings, the same or similar types of elements or respectively corresponding parts are provided with the same reference numbers in order to prevent the item from needing to be reintroduced.

DETAILED DESCRIPTION

Figure 1:
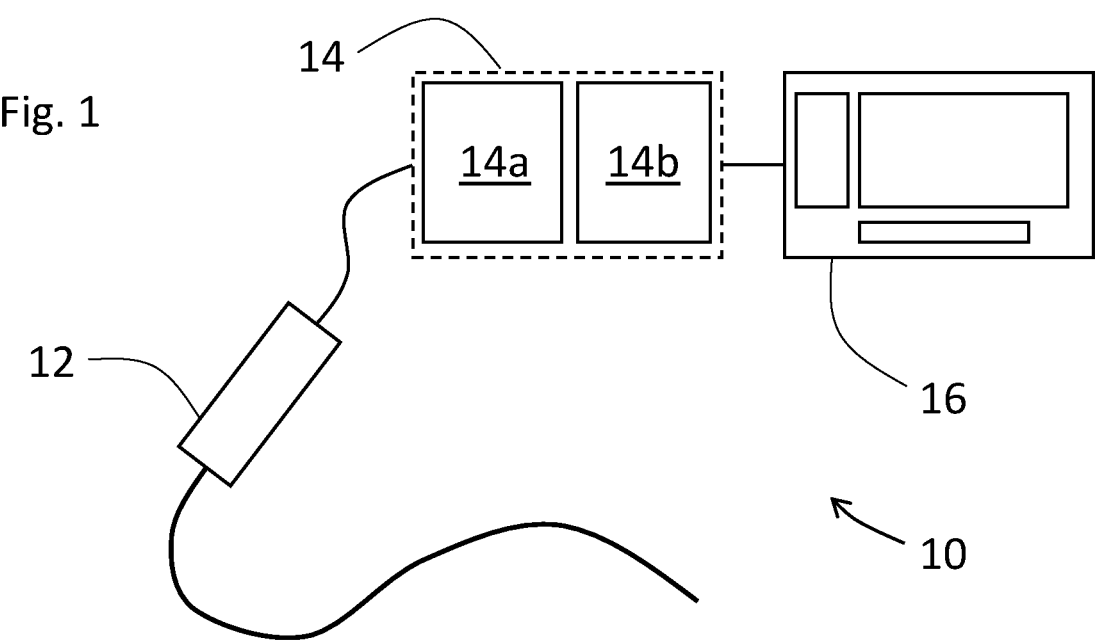
FIG. 1 illustrates a schematic of a computer aided assistance system according to the present disclosure.

FIG. 1 shows a schematic of a computer aided assistance system 10 according to the present disclosure. The basic setup includes a videoendoscopic instrument 12, which for the purpose of colonoscopies may be a colonoscope having a camera unit in its distal end portion and possibly one or more channels for guiding through endoscopic tools, such as snares or forceps. The videoendoscopic instrument 12 is connected with a controller 14 (such as one or more controllers, processors, circuits, CPU's and general purpose computers, hereinafter collectively referred to as a controller), which may power the electric components of the videoendoscopic instrument 12 and receives an image data stream from the videoendoscopic instrument 12. A software program or a suite of software programs running on the controller 14 provides the controller 14 with functionality to perform its task as computer aided assistance system 10, enabling it to assist in selecting appropriate treatment guidelines in the event that a lesion is identified during a colonoscopy.

The controller 14 may comprise two controllers, namely an endoscope supply controller 14a that controls and supplies the endoscope or endoscopes with energy and provides video processing, i.e., converts the electronic endoscopic video signals into a stream of images, and an image analysis controller 14b. The latter provides the image analysis functionality, a.o., image recognition, and contains the logic needed to execute the additional functions explained in the present disclosure. If the controllers 14a, 14b reside in different devices, a standard endoscopic supply and video processing controller may be used without modification, and the image analysis and decision making functionality may reside in a separate device, such as a programmable computer. For this case, the controller 14 is indicated in dashed lines in FIG. 1. Alternatively, the image analysis controller 14b may be implemented as software implementation in the computing section of an endoscopic supply and control device.

The controller 14, and, its image analysis controller 14a, is connected with or incorporates a display 16, which is configured to display the image feed from the videoendoscopic instrument 12 as processed by the supply and video processing controller 14a of the controller 14. The display 16 may be a separate and stand-alone video screen connected with the controller 14, or a screen integrated into the controller 14, such as the image analysis controller 14b. The display 16 or the controller 14 or its image analysis controller 14b may have suitable input means for inputting commands or data, e.g., in the form of a keyboard, a mouse device, switches or other manual input means, or a microphone for voice interaction functionality.

The overall system may also include endoscopic tools such as cold and hot snares or forceps including devices powering the hot tools.

Figure 5:
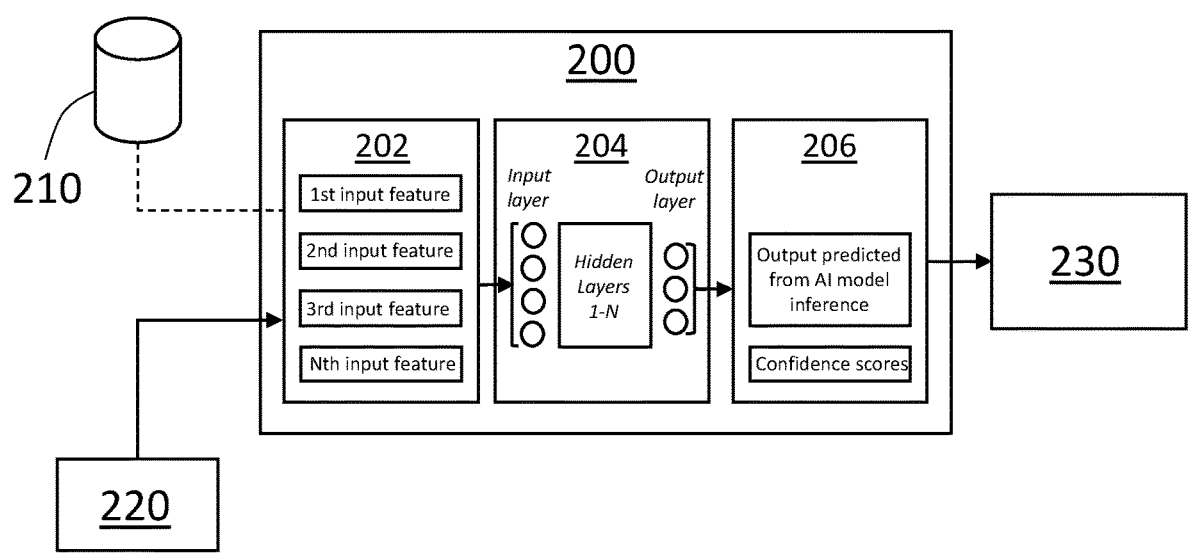
FIG. 5 illustrates a schematic representation of an exemplary computer-based clinical decision support system.

In further extensions, the controller 14 of the computer aided assistance system 10 shown in FIG. 1 or its image analysis controller 14b may be connected to a central server computer system running a database for past and present colonoscopic procedures and their findings, such as displayed in FIG. 5.

Figure 2:
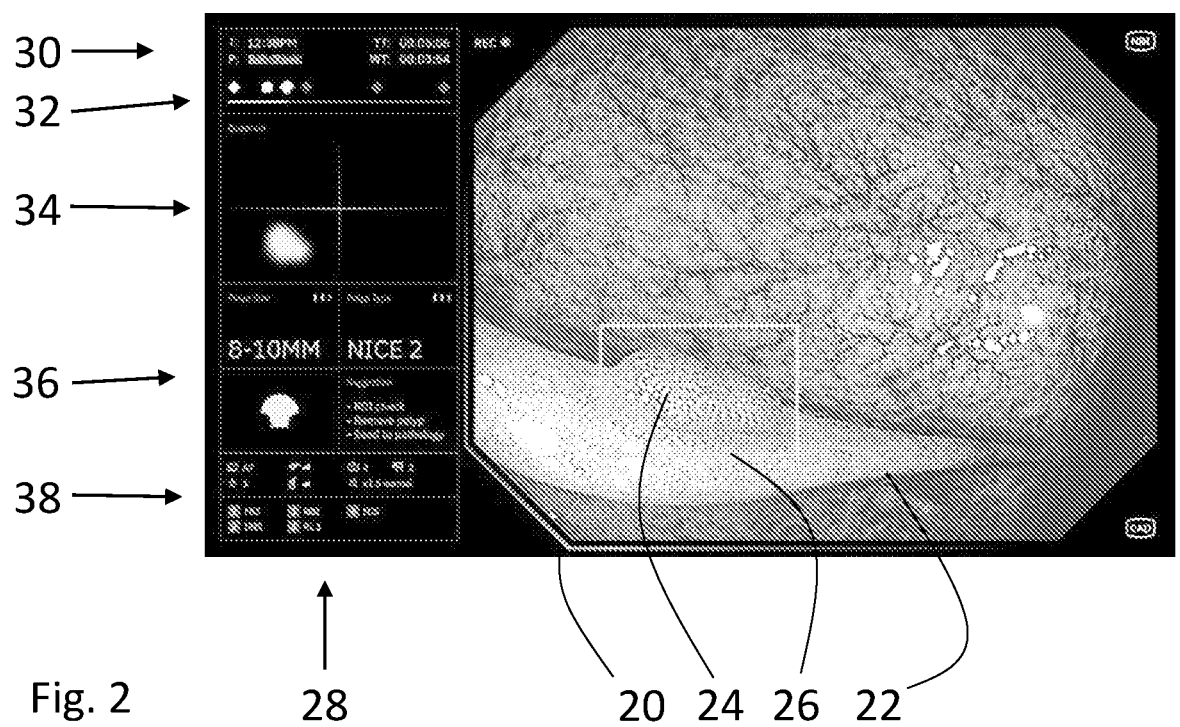
FIG. 2 illustrates a display view of a visual user interface of the computer aided assistance system according to the present disclosure.

FIG. 2 shows a display 20 of a visual user interface according to the present disclosure, which is displayed on the screen of a display 16 of the computer aided assistance system 10. The display 20 on the screen is divided into several areas. The largest area on the right side contains the image feed 22 of a colonoscopy from the videoendoscopic instrument 12 as processed by the controller 14, or its supply and video processing controller 14a. The image shows a part of a patient's colon wall with an identified lesion 24 in the form of a polyp. The lesion 24 is highlighted by a CAD overlay 26 in the form of a bounding box. A small symbol "CAD" in the lower right corner shows that the CAD overlay functionality is on. A small symbol "WLI" in the upper right corner indicates that the present image is captured using white light imaging (WLI). A symbol "REC" in the upper left corner of the image 22 indicates that the presently displayed image stream is being recorded.

The small area on the left side of the display 20 contains information about the colonoscopy procedure itself and about the lesion 24 shown in the image 22 on the right that is presently under study. The uppermost portion of this part of the display contains patient and procedural data 30, such as the present time ("T"), the patient's name ("P"), the time used to enter the colonoscope fully ("TT") and the withdrawal time ("WT"). Directly underneath the patient and procedural data 30 there is a progress bar 32 indicating the progress of the colonoscopy and the location of the distal end of the colonoscope. Landmarks of the colon, such as the cecum, the hepatic flexure and the splenic flexure, a.o., are indicated as diamond shaped symbols. Other symbols, such as a mushroom shaped symbol, represent the location of a lesion found during the colonoscopy or in a previous colonoscopy.

Underneath the progress bar 32, a circumferential location indicator 34 is displayed, which visualizes the location of the lesion presently under study in the circumferential direction. The lesion itself is indicated in the form of a heat map.

Underneath the circumferential location indicator 34, lesion information 36 is displayed in four areas. The upper left field shows the polyp size of 8-10 mm along with a small symbolic representation, in which two out of three bars are highlighted, indicating that this is a medium sized polyp. The upper right field shows that the lesion 24 is classified as being of type NICE 2, being characteristic of an adenoma. Since adenomas have the potential of turning cancerous, it is advisable that they be resected.

The lower left corner shows the symbol of a polyp, whereas the lower right corner contains a suggestion of treatment guidelines, namely, to perform an RDI (red dichromatic imaging) check to confirm the findings, remove the polyp and send the resected polyp tissue to pathology.

In the bottom area on the left side of display 20, instrumentation and mode information 38 are displayed. This includes, e.g., the magnification factor ("×1.5 normal") or the number of video sequences and still images recorded up to now, or the settings attributed to function keys on an input device ("FRZ", "NBI", etc.)

The user interface may be configured to the operator's preferences. E.g., he or she may prefer to have the images coming from the videoendoscopic instrument 12 be displayed on the left side of the screen instead of the right side, or change sizes of different areas. The number and choice of additional information displayed in field 28 may depend on the context and present state of the colonoscopy. E.g., the patient and procedural data 30, the progress bar 32 and possibly the instrumentation and mode information 38 may be displayed all the time, whereas the lesion information 36 and the circumferential location indicator 34 are only displayed while a lesion is presently under study, or at least within the field of view of the videoendoscopic instrument 12.

The choice of information on the display 20 may be done automatically by the controller 14, such as its image analysis controller 14b, depending on the context. If image recognition algorithms detect a lack of 360° coverage of the colon wall in certain sections of the colon, the operator may be prompted to move the videoendoscopic instrument 12 in such a way as to fill out, i.e., gain imagery from the formerly blind spot. The indication of the blind spot may be done, e.g., using a CAD overlay over the video image feed in the form of an arrow sign pointed in the direction of the blind spot or by using a representation similar to a combination of the progress bar 32 and the circumferential location indicator 34.

During the study of the lesion 24, the operator may notice that the information displayed about the lesion 24 does not match his or her own findings. The operator may then correct the findings by voice command or manually. E.g., if the operator arrives at a different classification, he or she may voice an address of the computer aided assistance system 10 such as "Hey System", followed by "Correct Polyp Type" and "NICE 1". The controller 14, such as its image analysis controller 14b, may then record both the previous value and the operator-corrected value of this parameter.

There may also be a functionality for the operator to measure a lesion 24 with graphic measurement tools using manual input, e.g., a mouse. In case of an automatic polyp size determination using image recognition functionality, a CAD overlay may be generated outlining the axis or axes giving rise to the size determination, which may then be modified by the operator, if necessary.

Figure 3:
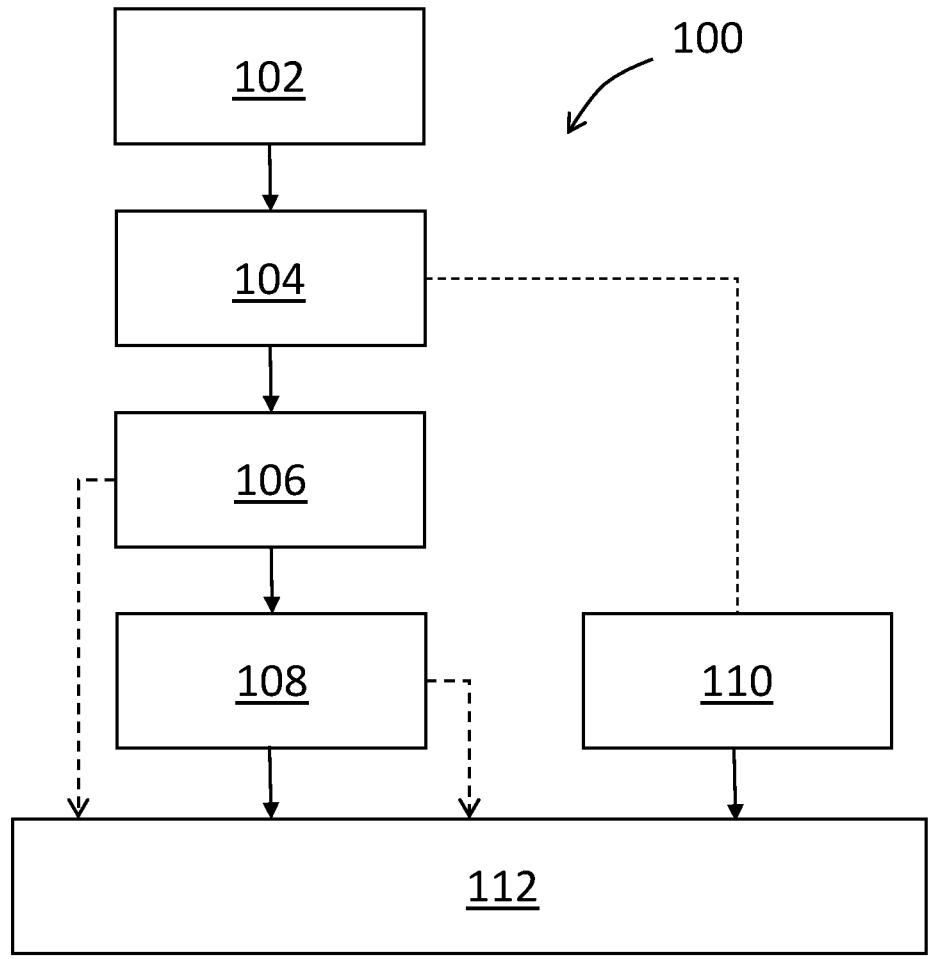
FIG. 3 illustrates a schematic representation of an embodiment of a workflow for selecting treatment guidelines.

A schematic representation of an embodiment of a treatment guideline selection scheme 100 for selecting treatment guidelines is shown in FIG. 3. The treatment guideline selection scheme 100 starts with the identification of a lesion in the video feed or a still image from the videoendoscopic instrument 12 in step 102. The identification may be made by eye by the operator or through image recognition functionality implemented in the controller 14, such as its image analysis controller 14b, which may be implemented using classic image recognition algorithms adapted for the visual characteristics of the various types of colorectal lesions, and/or using machine learning methods, e.g., neural networks trained for this task using a multitude of images of colorectal lesions, or other suitable machine learning algorithms.

Once a lesion is identified, the macroscopic type of the lesion is determined in step 104. The macroscopic type precedes the classification. In this case, the Paris classification may be used, wherein macroscopic lesion types are, e.g., the polypoid 0-Ip and 0-Is types, the non-polypoid 0-IIa, 0-IIb and 0-IIc types ranging from slightly elevated (0-IIa) to slightly depressed (0-IIc), and type 0-III of excavated lesions (ulcers). The determination of the macroscopic type may be done by the operator or using image detection functionality, again either using classical image detection algorithms or machine learning with neural networks or other suitable algorithms.

In some cases, e.g., in the case of a cancerous ulcer, there may be no need for further classification. After taking into account pit patterns of the lesion in step 110, and a treatment guideline 112 may be arrived at without further intermediary steps. The treatment guideline 112 may include removal of the lesion by surgery or by EMR (endoscopic mucosal resection) and having the removed tissue sent to pathology for further examination.

In all other cases, the next step 106 provides the determination of the classification of the lesion, e.g., according to a known classification scheme such as the NICE classification or the JNET classification. This classification may again be implemented by the operator or using classical or machine learning based image recognition functionality. Following, by way of non-limiting example, the treatment strategy algorithm proposed by M. Kato et al., "Validation of treatment . . . ", Endoscopy International Open 2018; 06: E934-E940, lesions classified as JNET types 2B and 3 may prompt suggestions of removal by EMR and surgery, respectively, possibly independent of their size, whereas lesions of JNET types 1 and 2A may be further divided into groups dependent on their size in step 108, and possibly their location in the colon. JNET type 1 lesions on the right side (ascending side) of the colon or having a size greater than 5 mm may be recommended to be removed by cold snare polypectomy, while other JNET type 1 lesions may be left without removal. In JNET type 2A lesions, it may be recommended to use cold forceps polypectomy or cold snare polypectomy, depending on size.

The treatment guideline 112 may also implement other suggestions, such as a check of NBI or RDI imagery of the lesion and the sending of a removed lesion to pathology, or other appropriate courses of action.

Once the scheme yields a treatment guideline, the treatment guideline is presented to the operator as illustrated in FIG. 2.

The schematic shown in FIG. 3 is intended to illustrate a possible implementation of the workflow, but is by no means intended to limit the scope of the present disclosure. Other schemes for arriving at treatment guidelines may be implemented alternatively, and schemes may be altered as practice reveals the need for adaptation, or new treatment methods and tools become available.

Furthermore, modern machine learning algorithms, such as some based on convolutional neural networks or other suitable algorithms of "artificial intelligence", may be trained to implement the complete scheme. This is done by training the neural network or other algorithm on training images that have underwent the workflow and an appropriate treatment guideline was determined according to the scheme. In the categorization training phase, the neural network is presented with the images of lesions from real or simulated colonoscopies and the corresponding treatment guideline as desired output. This training method incorporates steps 102 to 112 shown in FIG. 3 through the preparation of the training data.

Figure 4:
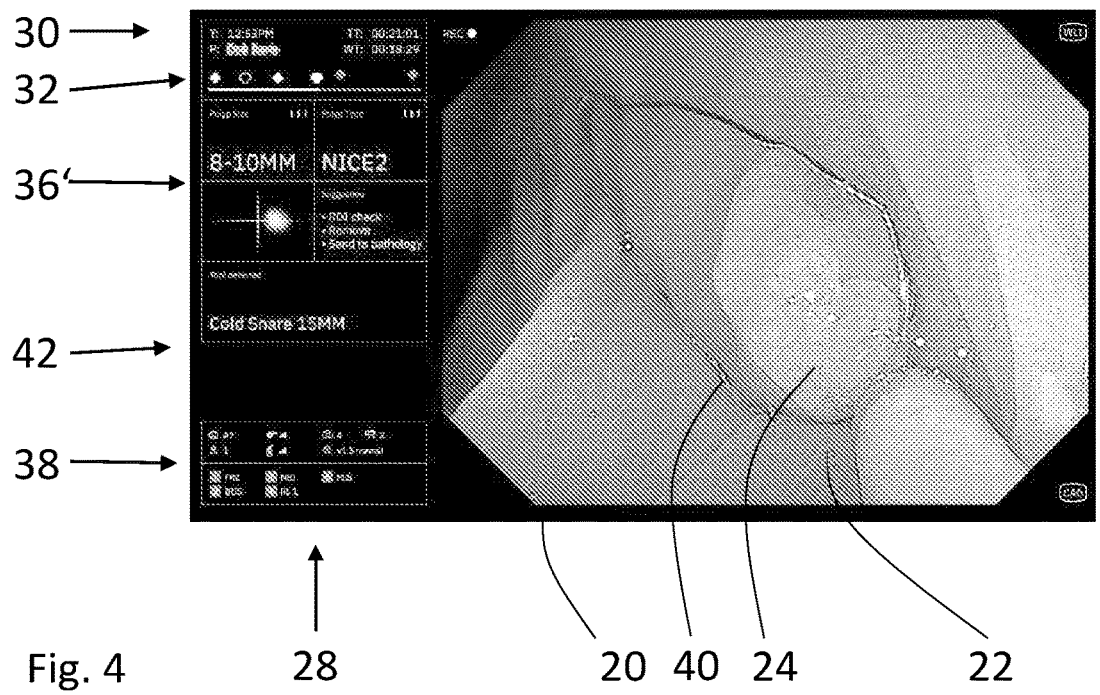
FIG. 4 illustrates another display view of a visual user interface of the computer aided assistance system according to the present disclosure.

FIG. 4 shows another display view of a visual user interface of the computer aided assistance system 10 according to the present disclosure. In contrast to FIG. 2, the colonoscopy imagery shown in FIG. 4 shows a 15 mm cold snare (40) endoscopic tool in the process of removing a lesion 24 of type NICE 2, as shown in the lesion information 36' and the endoscopic tool information 42 on the left side of the display 20. The overlay of CAD boxes or other indicators is turned off in order to reduce the mental load of the operator in this situation. The controller 14, such as its image analysis controller 14b, has identified the cold snare 40 automatically using image recognition functionality adapted or trained for this purpose.

The lesion information 36' is somewhat different from the one shown in FIG. 2. It contains a circumferential location indicator in a condensed form. This adaptation of sizes is done to give more visual weight to information pertaining to the procedure of removing a lesion in progress, namely the instrument used. In the case of a cold snare, this is relatively simple. In the case of EMR or HSP, there might be additional information about the activation status of the tool that would be displayed prominently.

FIG. 5 shows a schematic representation of an exemplary computer-based clinical decision support system 200 that is configured to implement aspects of the computer aided assistance system 10. In various embodiments, the CDSS 200 includes an input interface 202 through which input features such as data or previous findings which are specific to a patient are provided as input features to an artificial intelligence (AI) model 204, a processor which performs an inference operation in which the input features are applied to the AI model to generate an output, such as information to be displayed and a treatment guideline selected appropriate to a lesion found during a colonoscopy, and an output interface 206 through which the output is communicated to a user, e.g., a clinician.

In some embodiments, the input interface 202 may be a direct data link between the CDSS 200 and one or more medical devices that generate at least some of the input features. For example, the input interface 202 may transmit setting data of the videoendoscopic instrument 12 directly to the CDSS 200 during a colonoscopy. Additionally, or alternatively, the input interface 202 may be a classical user interface that facilitates interaction between a user and the CDSS 200. For example, the input interface 202 may facilitate a user interface through which the user may manually enter lesion sizes or classifications as input to the AI model. Additionally, or alternatively, the input interface 202 may provide the CDSS 200 with access to an electronic patient record from which one or more input features may be extracted. In any of these cases, the input interface 202 is configured to collect one or more of the following input features in association with a specific patient on or before a time at which the CDSS 200 is used to assess colonoscopy imagery of lesions in order to arrive at appropriate treatment guidelines to be presented to the clinician: lesion size, lesion classification, surface structure, location, if not already known from other procedure data sources or image recognition.

Based on one or more of the above input features, the processor performs an inference operation using the AI model to generate treatment guidelines and, possibly, context sensitive displays of information to the operator. For example, input interface 202 may deliver the input features gathered from a database 210, user input, instrumentation and/or image recognition, such as of a detected lesion 220, into an input layer of the AI model which propagates these input features through the AI model to an output layer. The AI model can provide a computer system the ability to perform tasks, without explicitly being programmed, by making inferences based on patterns found in the analysis of data. AI model explores the study and construction of algorithms (e.g., machine-learning algorithms) that may learn from existing data and make predictions about new data. Such algorithms operate by building an AI model from example training data in order to make data-driven predictions or decisions expressed as outputs or assessments.

There are two common modes for machine learning (ML), namely supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed. Federated learning enables multiple actors to build a common, robust machine learning model without sharing data, thus allowing to address critical issues such as data privacy, data security, data access rights and access to heterogeneous data.

In some examples, the AI model may be trained continuously or periodically prior to performance of the inference operation. Then, during the inference operation, the patient specific input features provided to the AI model may be propagated from an input layer, through one or more hidden layers, and ultimately to an output layer that corresponds to the treatment guidelines. For example, the input of imagery of an ulcer with specific pit pattern may be fed into the input layer of the neural net may propagate through the neural net and arrive with certain strengths at the neurons of the output layer representing different treatment guidelines. The treatment guideline of the output layer neuron having the strongest response is chosen. Given the quantity of its dominance over the other output layer neurons' responses, or lack thereof, a confidence score can be calculated as well. If the confidence score is too low, this may be indicated as well, prompting the clinician to further examine the lesion in question in the context of the patient's health and other parameters.

During and/or subsequent to the inference operation, the treatment guidelines may be communicated to the user via the user interface (UI). For example, the CDSS will inform a clinician of the patent specific AI generated output in the manner shown in FIG. 2 or 4 about the suggested diagnosis and treatment option and, possibly, the corresponding AI generated confidence level.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCES

10 System
12 videoendoscopic instrument
14 control unit
14a endoscope control subunit
14b image analysis subunit
16 display device with graphical user interface
20 display
22 image from video feed from endoscope
24 lesion
26 CAD overlay
28 display field with additional information
30 patient and procedural data
32 progress bar
34 circumferential location indicator
36 lesion information
36' lesion information
38 instrumentation and mode information
40 cold snare
42 endoscopic tool information
100 treatment guideline selection scheme
102 identification of lesion in video or still image
104 determination of macroscopic type
106 determination of classification
108 determination of size
110 determination of other characteristics
112 selection of treatment guidelines
200 clinical decision support system
202 input interface
204 AI model
206 output interface
210 database
220 detected lesion
230 treatment guideline

What is claimed is:

1. A computer aided assistance system for use in endoscopic colonoscopy procedures, the computer aided assistance system comprising:
at least one videoendoscopic instrument configured to capture image data;
a controller comprising hardware, the controller being connected with the at least one videoendoscopic instrument; and
a display connected or integral with the controller,
the controller is configured to:
automatically select a treatment guideline based on a combination of both a size and a classification of a lesion shown in the image data;
display the selected treatment guideline on the display;
detect an image of an endotherapy tool in the image data; and
automatically deactivate an overlay function to suppress a computer aided detection (CAD) overlay in the image data when the image of the endotherapy tool is detected in the image data.

2. The computer aided assistance system according to claim 1, wherein the controller comprises:
an endoscope control controller configured to provide supply and video processing functionality;
and an image analysis controller.

3. The computer aided assistance system according to claim 1, wherein the controller comprises image recognition functionality and is configured to automatically perform, on the image data provided by the videoendoscopic instrument, one or more of recognizing the lesion inside a colon, determining the size of the lesion and determining the classification of the lesion.

4. The computer aided assistance system according to claim 3, wherein at least one of the determination of the size of the lesion and the determination of the classification of the lesion is based on one of image processing, voice input from an operator or a manual input or selection by an operator through a human interface device.

5. The computer aided assistance system according to claim 4, wherein the image processing comprises narrow band imaging.

6. The computer aided assistance system according to claim 4, wherein the image processing comprises using a pit pattern on a surface of the lesion.

7. The computer aided assistance system according to claim 4, wherein the human interface device comprises one of the display and the controller.

8. The computer aided assistance system according to claim 1, wherein the controller is configured to at least one of identify and record a location of the lesion.

9. The computer aided assistance system according to claim 1, wherein the selected treatment guideline includes one or more of a suggestion to leave the lesion in place, a suggestion to perform polypectomy using hot snare polypectomy/endoscopic mucosal resection, a suggestion to perform cold polypectomy, and a suggestion to remove the lesion by surgery.

10. The computer aided assistance system according to claim 1, wherein the controller is configured to provide at least one of structured voice interaction functionality and unstructured voice interaction functionality for at least one of inputting at least one of the size of the lesion and the classification of the lesion, in-procedure reporting, correcting at least one of computer aided detection algorithm findings and computer aided diagnosis algorithm findings and documenting findings not covered by computer aided detection algorithms and computer aided diagnosis algorithms.

11. The computer aided assistance system according to claim 1, wherein the controller is configured to provide at least one of indicating insufficient coverage of mucosal surface to the operator, presenting previous reports or findings to an operator for comparison, and creating an automatic case summary.

12. A computer aided assistance method for endoscopic colonoscopy procedures, the method comprising:
during an endoscopic colonoscopy procedure, automatically selecting, using a controller, a treatment guideline based on a combination of both a size and a classification of a lesion shown in image data captured by a videoendoscopic instrument provided to the controller;
displaying the selected treatment guideline on a display;
detecting an image of an endotherapy tool in the image data; and
automatically deactivating an overlay function to suppress a computer aided detection (CAD) overlay in the image data when the image of the endotherapy tool is detected in the image data.

13. The computer aided assistance method according to claim 12, further comprising automatically performing, with the controller, on the image data, by image processing and recognition, at least one of recognizing the lesion inside a colon, determining the size of the lesion and determining the classification of the lesion.

14. The computer aided assistance method according to claim 12, further comprising at least one of identifying and recording, with the controller, the location of the lesion.

15. The computer aided assistance method according to claim 12, further comprising, using at least one of structured voice interaction functionality and unstructured voice interaction functionality provided by the controller, one or more of:
inputting at least one of the size of the lesion and the classification of the lesion;
in-procedure reporting;
correcting at least one of computer aided detection algorithm findings and computer aided diagnosis algorithm findings; and
documenting findings not covered by computer aided detection algorithms and computer aided diagnosis algorithms.

16. The computer aided assistance method according to claim 12, further comprising at least one of:
indicating insufficient coverage of mucosal surface to an operator;
presenting previous reports or findings to the operator for comparison; and
creating an automatic case summary.

17. A non-transitory computer-readable storage medium storing instructions that cause a computer to at least perform:
during an endoscopic colonoscopy procedure, automatically selecting a treatment guideline based on a combination of both a size and a classification of a lesion shown in image data captured by a videoendoscopic instrument; and
displaying the selected treatment guideline on a display;
detect an image of an endotherapy tool in the image data; and
automatically deactivate an overlay function to suppress a computer aided detection (CAD) overlay in the image data when the image of the endotherapy tool is detected in the image data.

18. A control apparatus comprising:
a controller comprising hardware, the controller being configured to:
receive captured image data from a videoendoscopic instrument used in an endoscopic colonoscopy procedure;
automatically select a treatment guideline based on a combination of both a size and a classification of a lesion shown in the image data;
control a display to display the selected treatment guideline;
detect an image of an endotherapy tool in the captured image data; and
automatically deactivate an overlay function to suppress a computer aided detection (CAD) overlay in the captured image data when the image of the endotherapy tool is detected in the captured image data.

19. The control apparatus according to claim 18, wherein the controller is configured to provide at least one of structured voice interaction functionality and unstructured voice interaction functionality for at least one of inputting at least one of the size of the lesion and the classification of the lesion, in-procedure reporting, correcting at least one of computer aided detection algorithm findings and computer aided diagnosis algorithm findings and documenting findings not covered by computer aided detection algorithms and computer aided diagnosis algorithms.

20. The control apparatus according to claim 18, wherein the controller is configured to provide at least one of indicating insufficient coverage of mucosal surface to the operator, presenting previous reports or findings to an operator for comparison, and creating an automatic case summary.

* * * * *